March 5, 1968 H. FORSTER ET AL 3,371,836

DEVICE FOR MAKING SEMICONDUCTOR ARRANGEMENTS

Filed Aug. 3, 1964 3 Sheets-Sheet 1

DEVICE FOR MAKING SEMICONDUCTOR ARRANGEMENTS

Filed Aug. 3, 1964 3 Sheets-Sheet 2

DEVICE FOR MAKING SEMICONDUCTOR ARRANGEMENTS

Filed Aug. 3, 1964

United States Patent Office 3,371,836

Patented Mar. 5, 1968

3,371,836

DEVICE FOR MAKING SEMICONDUCTOR ARRANGEMENTS

Hermann Forster, Schwarzenbruck, near Nuremberg, Horst Irmler, Nuremberg, Samuel Pfandler, Behringersdorf, near Nuremberg, and Winfried Schierz, Roth, near Nuremberg, Germany, assignors to Semikron Gesellschaft für Gleichrichterbau und Elektronik m.b.H., Nuremberg, Germany Filed Aug. 3, 1964, Ser. No. 387,047
Claims priority, application Germany, Aug. 5, 1963, S 86,552
4 Claims. (Cl. 228—40)

The present invention relates to a device for making semi-conductor arrangements with pn-junction, especially for rectifier arrangements with one or more tablets made of silicium mono-crystal.

The production of semi-conductor arrangements with pn-junction ready for use, for instance of rectifier arrangements, requires a considerable number of different working and treating operations which make the production of such parts very expensive. It is already possible to produce semi-conductor tablets with pn-junction and connecting electrodes of non-unilateral conductivity in a relatively economical manner for currents up to 1 ampere. However, the economical carrying out of the subsequent operations, viz. the steps of connecting the wires to the semi-conductor tablets, the soldering, washing, etching, and drying operations as well as the arrangement of the semi-conductor part or parts in a housing in order to protect the same against atmospheric conditions, is very difficult.

It is already known for the mass production of small condensers, to provide small tubular members of insulating or semi-conducting material which have their cylindrical inner or outer surface coated with a metal layer, with connecting wires in such a way that the small tubular members are slipped onto a leg of a wire bent in the form of a hairpin. Thus, at some distance from the bent portion of hairpin, the tubular member is clamped between the legs of the hairpin while the legs rest against one metal coated portion each. By dipping the arrangement into a liquid solder, the wires are connected to the metal coating. The connection existing between the two wire legs is subsequently removed. This method is, however, not applicable without difficulty to semi-conductor tablets having a thickness of approximately 0.3 millimeter and a surface of approximately 0.5 to 2 square millimeters.

It is, therefore, an object of the present invention to provide a device for economically producing semi-conductor arrangements.

It is another object of the present invention to more economically carry out the connection of the wires to the semi-conductor tablet.

It is a still further object of the present invention to provide a device for producing semi-conductor arrangements as set forth in the preceding paragraphs, in which the soldering, washing, etching, and drying operations are carried out in a very simple and inexpensive manner.

These and other objects and advantages of the present invention will appear more clearly from the following specification in connection with the accompanying drawings, in which:

FIGURE 1 shows on an enlarged scale a rectifier tablet for use in connection with the present invention;

FIGURE 2 illustrates a metallic round for use as an intermediate layer in the arrangement according to the present invention;

FIGURE 3 is a perspective view of the metal round of FIGURE 2 with a semi-conductor tablet according to FIGURE 1, placed thereon;

FIGURE 4 is a perspective view similar to that of

Figures 1, 2, 3, 4, 5, 6, 7, 8, 9, 12:
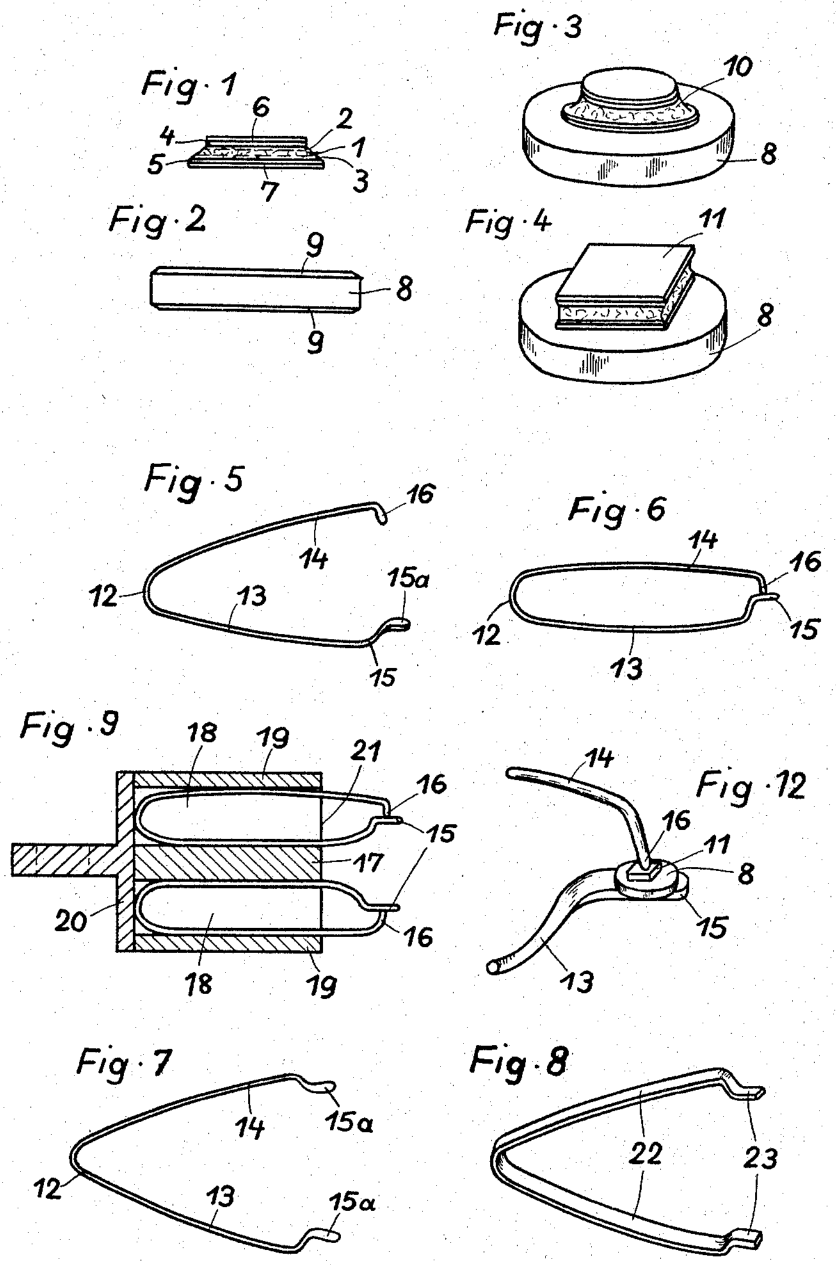
Figure 10:
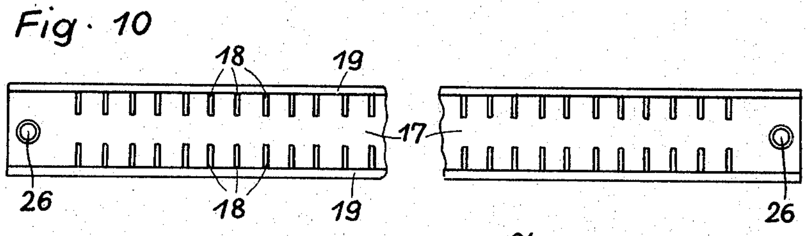
Figure 11:
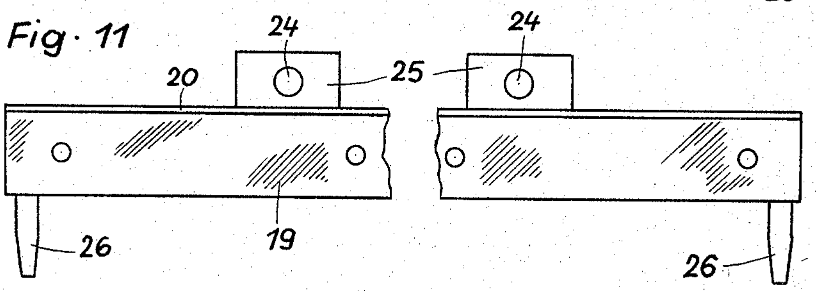
Figure 19:
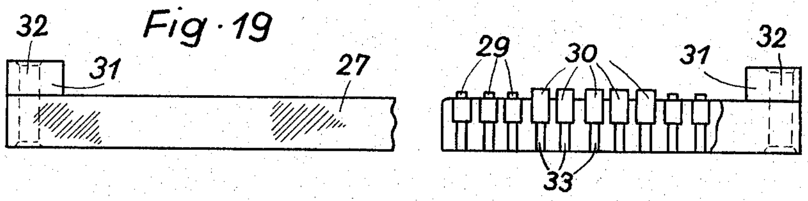
Figure 20:
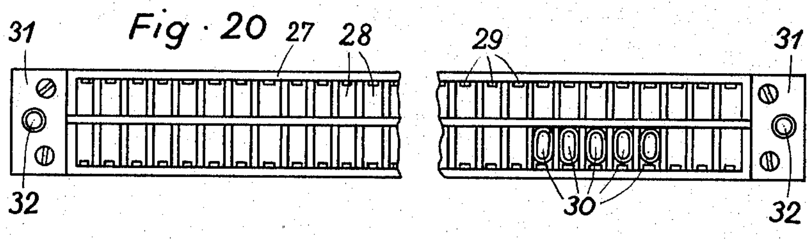
Figure 22:
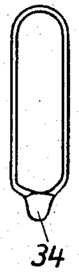
Figure 23:
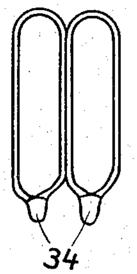
Figure 24:
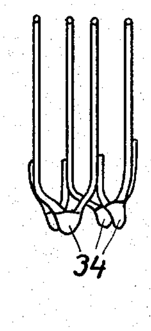
Figure 25:
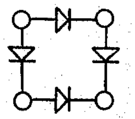
Figures 13, 14, 26:
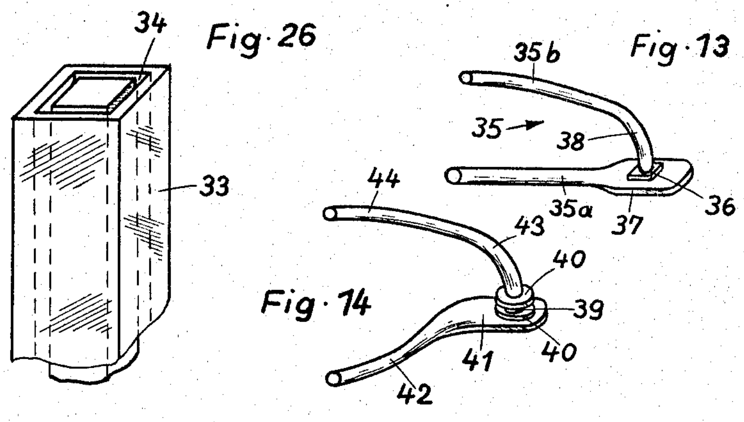
Figure 15:
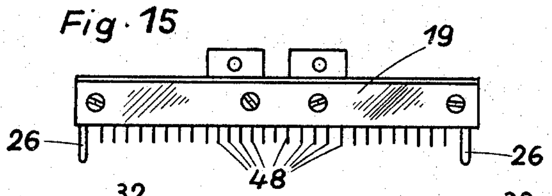
Figure 16:
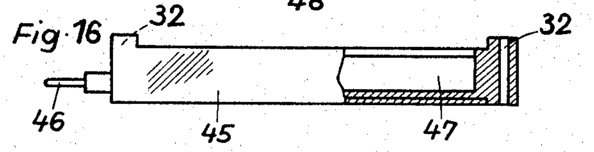
Figure 17:
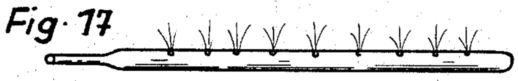
Figure 18:
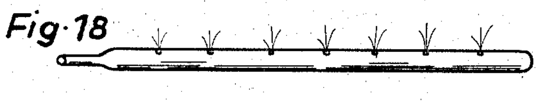
Figure 21:
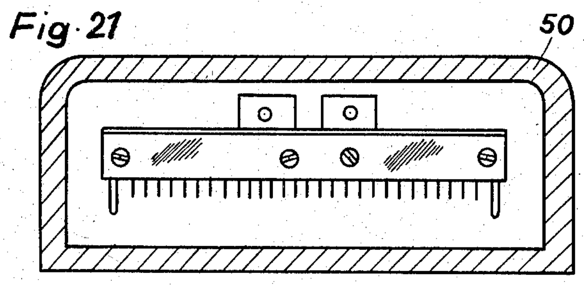

FIGURE 3 but showing a semi-conductor tablet of a shape modified over that of FIGURE 3;

FIGURE 5 represents a hook-shaped clamping member of actual size for connection with a semi-conductor tablet;

FIGURE 6 illustrates the clamping member according to FIGURE 5 in clamped condition with the ends thereof engaging each other;

FIGURES 7 and 8 represent modified embodiments of the clamping member according to FIGURES 5 and 6;

FIGURE 9 illustrates a section through a device for receiving the clamping members according to FIGURES 5 to 8;

FIGURE 10 is a front view of the device according to FIGURE 9;

FIGURE 11 is a top view of the arrangement of FIGURE 10;

FIGURES 12 and 13 respectively illustrate the front end of a clamping member according to the present invention with a metallic round and a semi-conductor tablet clamped therein;

FIGURE 14 illustrates the front end of a clamping member according to the present invention having two metal rounds and a semi-conductor tablet clamped between its ends;

FIGURE 15 shows the arrangement of FIGURE 11 with the clamping means and the semi-conductor tablets arranged therein;

FIGURE 16 illustrates a container provided with guiding means for receiving the arrangement according to FIGURE 15;

FIGURES 17 and 18 respectively illustrate a device for washing and spraying the soldered semi-conductor with water or hot air, respectively;

FIGURE 19 illustrates a side view of a device for receiving a plurality of small containers, used for providing the semi-conductor tablets according to the present invention with a protective cap;

FIGURE 20 is a top view of the arrangement of FIGURE 19;

FIGURE 21 is a front view of a tunnel-shaped oven for use in connection with the present invention and showing the device according to FIGURE 15 arranged in said oven;

FIGURE 22 shows the finished soldered semi-conductor or rectifier according to the present invention, said semi-conductor being provided with a protective cap;

FIGURE 23 shows two semi-conductors according to FIGURE 22 connected to each other;

FIGURE 24 shows an arrangement of four rectifiers or semi-conductors soldered to each other and forming a so-called bridge connections;

FIGURE 25 shows the circuit of the arrangement according to FIGURE 24;

FIGURE 26 is a perspective view of a device for producing a rectifier arrangement according to FIGURE 24.

The apparatus according to the present invention utilizes the idea of employing a loop-shaped wire for holding a semi-conductor tablet and of subsequently soldering the metal coatings thereof with the legs of the loop, and of thereafter slitting open the wire loop. According to the present invention V-shaped clamping members provided with bent-off ends in the manner of pliers, have their legs pressed against each other so that the ends thereof engage each other. Said clamping members are inserted with their respective other or closed end into correspondingly designed gaps of a receiving device while the said bent-off ends resiliently resting against each other protrude beyond said device. Furthermore one semi-conductor tablet each is clamped between the bent-off wire ends and one metal coating each of the semi-conductor tablets is connected to one of the legs of the loop-shaped clamping member.

According to a further feature of the present invention, a metal round or flag is clamped between and soldered to the bent-off ends of the loop-shaped clamping member provided with a corresponding supporting surface and the semi-conductor tablet, while said metal round laterally protrudes beyond said semi-conductor tablet.

Advantageously, in connection with the present invention, semi-conductor tablets are employed which have received their pn-junction by the so-called diffusion method. According to this diffusion method, the process starts from large discs of silicium mono-crystals which are produced by sawing from a rod and have a thickness of 180 to 230 microns and a diameter of approximately 25 millimeters. Such a disc is, following the sawing operation, lapped on both sides in order to remove the faults of the mono-crystal due to the sawing. This silicium mono-crystal is manufactured in such a way as to be merely slightly positively or negatively conductive. This operation is called s-doping (soft doping). The lapped and cleaned discs are subsequently coated on one side with a boron-containing solution (for instance boric acid) and on the other side with a phosphorus solution (for instance phosphoric acid). The so-treated silicium discs are placed on top of each other while providing an intermediate layer of aluminum oxide powder therebetween, and treated in an oven at a temperature of approximately 1300° C. for a period of 16 to 40 hours. At this temperature, from one side boron atoms and from the other side phosphorus atoms diffuse into the silicium. After the silicium tablets have cooled down, they are covered on both sides with a glass-like brittle coat which is removed by grinding, lapping, or by chemical agents In this way, the silicium tablets have obtained a so-called p-s-n structure, i.e. the tablets block electric current in one direction while not interfering with the conduction of the current when the direction of voltage is reversed. The thus treated silicium tablet is, by a known method, provided on both sides with a nickel coating. Subsequently, the tablets are subdivided by an etching or sawing process.

Referring now to the drawings in detail, FIG. 1 shows a tablet produced in conformity with the above-described diffusion method on an enlarged scale. The tablet is formed, for instance by a silicium mono-crystal with a slightly p- or n-doped central layer 1. The reference numerals 2 and 3 designate a p- or n-doped layer respectively produced by the above-mentioned diffusion process. The semi-conductor tablet is furthermore provided with an upper layer 6 and lower layer 7 of gold, tin or soft solder, for instance, a lead-silver-copper solder. The truncated-cone shape of the tablet is due to the fact that the same was etched from a larger tablet. Reference numerals 4 and 5 represent upper and lower nickel coatings, respectively.

FIG. 2 shows a round 8 which advantageously consists either of a material with low coefficient of thermal expansion as, for instance molybdenum, or of a nickel-cobalt-iron alloy called "Vacon" or "Cova," or of a material having a high heat-conducting coefficient as, for instance, copper. These rounds are advantageously punched out from sheet metal of a suitable thickness as, for instance 0.5 millimeter, while the sheet metal is provided on both sides with a coating 9 having good soldering properties, preferably lead or a lead alloy. When employing larger semi-conductor tablets, it is advantageous to produce the rounds of a material having a low coefficient of thermal expansion in order to avoid tensions within the semi-conductor tablet. When employing relatively small semi-conductor tablets, it is more favorable to manufacture the metal rounds of a material having a high coefficient of heat conductivity in order to improve the heat dissipation from the semi-conductor tablet to the surrounding atmosphere.

The pre-etched and cleaned semi-conductor tablets are preferably placed onto an electrically conductive support and are inserted by means of a pair of suction pincers into the loop-shaped clamping member to be described further below, or placed onto the metal rounds. In this way, simultaneously, faulty parts may be eliminated and the blocking properties of the rectifier or semi-conductor tablet may be checked.

The checking of the semi-conductor tablets as to their blocking behavior, may be effected by a relatively simple device (not shown). This device comprises an electrically conductive support onto which the semi-conductor tablets are placed. The arrangement furthermore comprises a voltage source, a resistor, a gow lamp, and the above-mentioned suction pincers which have to be metallically conductive and which are provided with a handle of insulating material. When touching the upper electrode of a semi-conductor tablet with the suction pincers, a closed circuit is obtained in which the voltage source, the semi-conductor tablet, the resistor, and the glow lamp are arranged in series. Depending on the position of the semi-conductor tablet, the same is arranged in said circuit either in the blocking or in the non-blocking direction. It is advantageous to employ an arrangement in which the magnitude of the voltage may be varied.

As will be evident from the above, a perfect tablet is present if, in one position of the tablet, no current passes through the circuit—in other words, the glow lamp does not light up, while in the other position, current passes through the circuit so that the glow lamp lights up. In all other instances, the semi-conductor tablet is more or less faulty. In case the glow lamp lights up in both positions of the semi-conductor tablet, the table does not block sufficiently. If the glow lamp does not light up in either position, the tablet does not permit the passage of current. The semi-conductor tablet is tested with a voltage corresponding approximately to the voltage under which the tablet operates during practical use.

When employing a metal round according to FIG. 2, it is advantageous to place the semi-conductor tablets prior to the operating steps, onto said round as is shown, for instance in FIGS. 3 and 4. The metal rounds are so selected that they laterally protrude beyond the semi-conductor tablet. When employing an etched semi-conductor tablet 10 as, for instance shown in FIG. 3, the tablets should be placed onto the round 8 with their larger end faces, for purposes of orienting the same according to their polarity with regard to the connecting wire. In case a tablet 11 is used according to FIG. 4 which has been produced by sawing, such a mere visual orientation according to the size of the end faces is not possible. In this case, the polarity of the tablet has to be determined by a test so that the tablets are always placed upon the metal round with one and the same pole.

Referring now to FIGS. 5 to 8, these figures show various clamping members made of wire and serving as connecting wires. The clamping member shown in FIG. 5 comprises an approximately circularly bent portion 12, a lower leg portion 13, and an upper leg portion 14. According to a feature of the present invention, either one or both ends of the legs of the clamping member may be bent toward each other. According to a still further feature of the present invention, the ends 15, 16 of the two legs 13 and 14 are bent in such a way that they extend toward each other up to half the spacing between the leg portions 13 and 14, while at least one of the two bent end portions is provided with a small surface 15a on which the other bent end portion 16 rests in such a way that it is approximately perpendicular to said surface. This small surface 15a may, for instance be produced by correspondingly squeezing the wire.

FIGURE 7 illustrates a further embodiment of a clamping member according to the present invention in which both ends of the regs 13, 14 are provided with a squeezed and bent-off surface 15*a*. The clamping member according to FIG. 8 is made of flat wire while both ends of the legs 22 are bent off for purposes of clamping therebetween a semi-conductor tablet or a semi-conductor tablet and a metal round.

In order to assure that the clamping members serving for clamping the semi-conductor tablets are prevented from slipping out of the recesses of a receiving device when bent and introduced thereinto, according to a further feature of the present invention, the leg portions of the clamping member are slightly bent outwardly while their greatest spacing in bent condition is slightly greater than the height of the recesses of the receiving device.

As can be seen from FIGS. 5 and 6, the legs 13, 14 are slightly bent toward the outside, which makes it possible to hold the same very easily in a receiving device used in connection with the method according to the present invention and to be described in detail further below. The above-described clamping members are preferably made of copper wire not drawn too hard and lightly silvered. The clamping members may, however, also be made of other materials as, for instance "Vacon."

Referring now to FIGS. 9 to 11, the device for receiving the above-described clamping members is preferably designed as a rod in which a larger number of preferably rectangular recesses is provided which are arranged beside or on top of each other. This receiving device may be so designed that, for instance 100 clamping members may be received therein while the ends of said clamping members resiliently engaging each other are all located in one and the same plane.

FIG. 9 shows in cross-section a receiving device according to the present invention having two recesses 18 arranged one above the other with regard to FIG. 9. The device may, for instance consist of a rod 17 made of light metal or a light metal alloy into which slots or recesses 18 are sawed or milled. These slots or recesses have their top, bottom and rear sides covered by plates 19 and 20 made of the same material while leaving at the front side an opening 21. The slots or recesses 18 are of rectangulare shape while their height is preferably so selected that it is somewhat smaller than the spacing between the legs 13, 14 of the clamping member. In this way, the ends 15, 16 of the clamping member are resiliently pressed against each other with a certain force when being introduced into the slots 18. It is desirable that this force is not greater than 30 and not smaller than 10 grams.

The device of FIG. 9 is shown in front and in top view in FIGURES 10 and 11. As will be evident from these figures, the receiving device has its rear side provided with fish-plates 25 with bores 24 arranged therein which serve for suspending the device. Furthermore, the receiving device is provided with bolts 26 adjacent the ends of the front side of the device for purposes of guiding the same during the soldering and subsequent washing, etching, and drying operations.

After the semi-conductor tablet or the combination consisting of a metal round and a semi-conductor tablet has been clamped between the ends 15 and 16, the same are adjusted by sight without necessitating any further adjusting work. FIG. 12 shows the front end of the clamping member having the metal round 8 and the semi-conductor tablet 11 arranged between its legs 13, 14, on an enlarged scale following the adjusting operation.

It is, of course, to be understood that it is also possible to employ one round each on both sides of the semi-conductor tablet and to clamp the same in the manner described above, instead of using just one single metal round 8.

Two possibilities of arranging the semi-conductor tablet between the ends of the clamping member are illustrated in FIGS. 13 and 14. The clamping member 35 shown therein may, for instance, consist of "Vacon" while the semi-conductor tablet 36 is directly placed upon the flat portion 37 of the lower leg 35*a*. The downwardly bent end 38 of the upper leg 35*b* rests upon the top side of the tablet 36 with a certain force when the same is introduced into the receiving device prior to the soldering operation.

According to the arrangement shown in FIG. 14, a semi-conductor tablet 39 is spaced between two rounds 40 made of "Vacon." The lower round 40 rests upon the flat portion 41 of the lower leg 42 of the clamping member. Also in this instance, the downwardly bent portion 43 of the upper leg 44 of the clamping member presses the portions 39 and 40 against each other with a certain force prior to the soldering operation.

Referring now to FIG. 15, the arrangement shown therein illustrates the receiving device of FIG. 11 during the operation of the device in which the rectifier or semi-conductor tablets are clamped between the clamping members which have been inserted into the receiving recesses or slots of the device. The receiving device or bar 19 is provided with guiding bolts 26 by means of which it can be inserted into a plurality of devices as, for instance, the one shown in FIG. 16, as is necessary during the process of providing the semi-conductor tablets with their connecting wires. The arrangement shown in FIG. 16 represents a container 45 which may be heated through the intervention of an electric conduit 46. Container 45 is filled, for instance with a solder 47 for the dip-soldering operation. The clamping members 48 provided with the semi-conductor tablets and, if desired, with metal rounds, and downwardly protruding from the bar 19, become immersed in the solder bath 47 when the guiding bolts 26 are introduced into the guiding bores 32 in the container 45. In this way, a plurality of semi-conductor arrangements may be soldered simultaneously.

Advantageously, lead alloys and particularly lead-silver alloys or lead-silver-copper alloys of eutectoid composition or a lead-indium alloy are employed as solder. In a manner known per se, for the soldering operation colophonium may be used as flux, which advantageously covers the soldering bath. However, also a solution of thiocarbamide and tartaric acid may be used as flux. It is necessary that the bar 19 be lowered slowly while the ends of the clamping members or hooks remain in the bath for about 15 seconds. The temperature of the soldering bath preferably is within the range of 350° C. for the solders mentioned.

Following the soldering operation, the semi-conductor arrangements are rinsed with tap water by means of a device as, for instance shown in FIG. 17. Subsequently, the arrangements are rinsed in a bath which contains tartaric acid of a concentration of approximately 40% by weight. After this rinsing operation with tap water, the semi-conductor arrangements are rinsed with de-ionized water and acetone. Finally, the semi-conductor arrangements are dried by means of a blast of hot air by a device as shown in FIG. 18.

According to a still further feature of the present invention, the above-described device is not only employed for the soldering process which advantageously is effected as a dipping method, but serves also for all operations subsequent to the soldering, viz. the washing, etching, and drying steps for which likewise preferably a dipping method is employed.

Furthermore, the device according to the present invention for receiving the clamping members or hooks serves also for the common execution of all those method steps following the soldering operation which serve for protecting the tablets against atmospheric conditions and for capsuling the same. Thus, especially semi-conductor tablets provided with connecting wires, may, in the vicinity of these tablets, be covered with a synthetic resin coating which is subsequently cured. Also, the last-mentioned method step is performed in a so-called dipping method. The semi-conductor arrangements, which may be provided, if desired, with a coating of silicone caoutchouc, may then be capsuled collectively. Due to the new method according to the present invention, semi-conductor arrangements and especially rectifiers made of silicium mono-crystal may be produced relatively cheaply and ready for use.

As mentioned above, subsequent to the soldering and rinsing operations, the semi-conductor arrangements are etched. This etching operation takes place in a container similar to that used for the soldering operation and shown in FIG. 16. As etching bath, a solution of hydrofluoric acid, acetic acid, phosphoric acid, fuming nitric acid, and hydrochloric acid may be used. Subsequently, the semi-conductor arrangements have to be rinsed thoroughly with tap water, de-ionized water and acetone, and thereafter the arrangements are dried again by hot air.

The protective layer is brought onto the semi-conductor arrangements by means of a device as shown, for instance in FIG. 16. First, the ends of the clamping members or hooks are dipped into a hot mixture of silicone lacquer; then, the semi-conductor arrangements are burned in a drying oven or tunnel furnace 50 (see FIG. 21) for a period of 14 to 16 hours at a temperature of approximately 160° C. Thereafter, the semi-conductor arrangements are dipped into a hot silicone caoutchouc mixture, which is likewise performed in a device according to FIG. 16. Also this last-mentioned coating is dried and cured at a temperature of approximately 150° C.

The receiving device described above and shown in FIGS. 9 to 11 serves for holding the semi-conductor arrangements until they are received in a container for purposes of capsuling the semi-conductor arrangements. However, the same device may, in connection with the arrangements shown in FIGS. 19 and 20, be used also for capsuling the semi-conductor arrangements. As will be evident from FIGS. 19 and 20, the receiving device shown therein comprises a bar 27 of light metal or a light metal alloy. The bar 27 has its upper portion provided with recesses 28 for receiving containers 30 which are, for instance made of phenol resin. Clamping springs 29 laterally protruding somewhat beyond the recesses, prevent the containers 30 from falling out of the device when the same is turned during the capsuling operation. The bar 27 has both ends of its upper portion provided with spacer members 31 connected to the bar 27 in any convenient manner and with guiding bores 32, so that the semi-conductor arrangements are all located within the containers 30 when the holding and receiving device provided with the clamping members is placed thereon.

The containers 30 arranged in the bar 27 of FIG. 20 are filled by a machine with hot synthetic material, for instance Araldit. Thereupon, the clamping members or hooks are introduced into the containers 30 by means of the receiving device shown in FIGS. 9 to 11. After the synthetic material has been cured and the device has sufficiently cooled, the receiving device (bar 19) is disengaged from the bar 27. Bar 27 is also provided with bores 33 serving for discharging the finished semi-conductor arrangements or rectifier arrangements.

A finished semi-conductor or rectifier arrangement manufactured in conformity with the present invention in a device according to FIGS. 9 to 11 and 19, 20, is shown in FIG. 22. The reference numeral 34 designates the contacting point provided with a coating of silicone lacquer and the coating of silicone rubber.

In conformity with the method according to the present invention, it is, however, also possible, for instance to provide two, four or six rectifier tablets with their connecting wires and simultaneously to interconnect the same in such a way that they form a so-called center point circuit or bridge circuit. In order to accomplish this, it is merely necessary to arrange the recesses in the device for receiving the clamping members or hooks in such a way that two or three adjacent legs of the clamping members engage each other, and to subsequently solder the same.

FIG. 23 shows, for instance two rectifier tablets soldered together in such a way that they form a so-called center point circuit or wiring. FIG. 24 shows an arrangement in which four clamping members are soldered together so as to form a bridge wiring or circuit. In order to produce an arrangement like this, a device according to FIG. 26 is employed. The arrangement shown in FIG. 26 substantially consists of a bar 33, for instance of light metal, which has its upper end face provided with a rectangular recess 34. The clamping members or hooks shown in FIGS. 5 to 8 may be introduced into the recess 34 so as to form a rectangle and may subsequently be soldered together by dipping the same into a soldering bath. In order to obtain for each connecting conductor only one wire, the connecting wires of two of the four clamping members or hooks, are shortened. The circuit of the rectifier arrangement of FIG. 24 is shown in FIG. 25.

Subsequent to the capsuling operation, the clamping members or hooks have to be cut or slit open. This can be done, for instance by hand, by means of a pair of pliers. Advantageously, however, the device of FIGS. 19, 20 is together with the finished rectifier arrangements inserted into a device provided with corresponding slots, so that the ends of the clamping members or hooks protrude on one side. Thus, the rounded end portions 12 of the clamping members may be slit open by a knife.

It is furthermore advantageous to provide the connecting wires with a tin coating. A container for providing the connecting wires with such a tin coating may be of the general design as shown in FIG. 16. In this instance, the container 45 would be provided with guiding studs 26 for insertion into guiding bores 32 of the holding device according to FIGS. 19 and 20.

As a final step, the finished semi-conductors are tested.

It is, of course, to be understood, that the present invention is, by no means, limited to the arrangements and devices shown in the drawing, but also comprises any modifications within the scope of the appended claims.

What is claimed is:

1. An apparatus for use in applying terminals to semiconductors in which a resilient U-shaped yoke has the free ends of legs thereof attached to opposite faces of the semiconductor and the closed end of the yoke is cut apart to form the terminals, said apparatus comprising; a bar-like holder, a plurality of recesses extending into one side of the holder, each recess having a depth less than the length of a yoke so that a yoke introduced into a recess closed end foremost will have its free ends exposed, the lateral dimension of each recess being less than the distance across the legs of a yoke when the free ends of the yoke are in engagement so a yoke when disposed in a recess will have its ends urged resiliently against each other so as to be able to grip a semiconductor therebetween, a member having a cavity therein for treatment material for treating the exposed ends of said yokes when the yokes are in said holder, and cooperating elements of guide means on said holder and member to guide the holder into assembled position with said member so yokes in said holder will have their projecting ends disposed in said cavity of said member.

2. An apparatus according to claim 1 in which said member includes means for heating material in said cavity.

3. An apparatus according to claim 1 in which said member includes means for supporting containers for receiving the free ends of yokes in the holder together with semiconductors clamped therebetween.

4. An apparatus according to claim 1 in which said recesses are arranged in said holder so that legs of adjacent yokes in said holder are in close proximity to each other and become soldered together when the holder is assembled with said member and solder is supplied to the cavity of said member.

(References on following page)

References Cited

UNITED STATES PATENTS 2,321,071 6/1943 Ehrhardt ------------ 20—155.5
2,693,634 11/1954 Huyett --------------- 29—203
2,766,510 10/1956 Heibel -------------- 29—25.42
3,263,303 8/1966 Oates --------------- 29—155.5
2,058,128 10/1936 Brubach ----------- 118—503 X
3,168,885 2/1965 Weiss -------------- 228—36 X WILLIAM I. BROOKS, *Primary Examiner.*